United States Patent Office 2,882,780
Patented Apr. 21, 1959

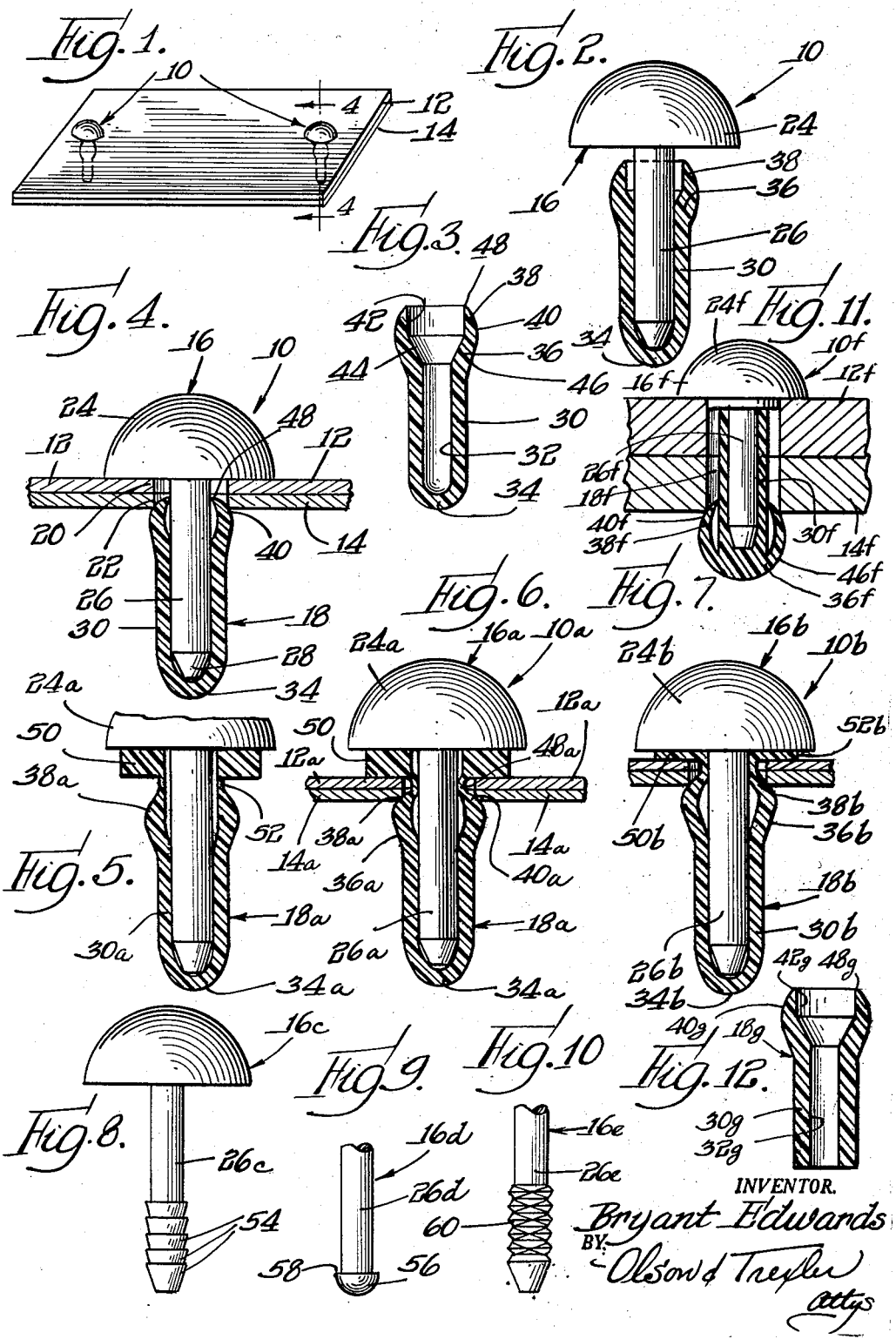

2,882,780

SNAP-IN STUD WITH DEFORMABLE PLASTIC ENGAGING MEANS

Bryant Edwards, Chicago, Ill., assignor to Illinois Tool Works, Chicago, Ill., a corporation of Illinois Application September 20, 1955, Serial No. 535,361

3 Claims. (Cl. 85—5)

The present invention relates to a novel fastener, and more particularly to a novel fastener adapted to be applied to an apertured work structure from one side thereof.

An object of the present invention is to provide a novel preassembled fastener unit including a stud member and an anchor member, which unit is of relatively simple and economical construction and is formed so that it may be easily applied in preassembled condition to an apertured work structure and is securely retained in assembled relationship therewith.

A more specific object of the present invention is to provide a novel fastener unit including a stud member and a resilient plastic anchor member which may be easily produced and preassembled and which are formed so as to have great holding power resisting axial separation thereof and also resisting axial separation of the fastener unit from an apertured work structure.

A further object of the present invention is to provide a novel preassembled fastener unit of the above described type which not only may be easily and securely applied to an apertured work structure from one side thereof, but which also functions effectively to seal the aperture in the work structure.

Another more specific object of the present invention is to provide a novel preassembled fastener unit of the above described type wherein the stud member is formed of metal and wherein the anchor member is formed so as to completely insulate or separate the stud member from the work structure.

Other objects and advantages of the present invention will become apparent from the following description and the accompanying drawings wherein:

Fig. 1 is a perspective view showing preassembled fastener unit embodying the principles of the present invention applied to an apertured work structure;

Fig. 2 is a partial sectional view showing a preassembled fastener unit incorporating the features of the present invention;

Fig. 3 is a sectional view showing the novel anchor member of the present invention;

Fig. 4 is a partial sectional view taken along line 4—4 of Fig. 1;

Fig. 5 is a partial sectional view similar to Fig. 2 but showing a modified form of the present invention;

Fig. 6 is a partial sectional view showing the fastener of Fig. 5 applied to an apertured work structure;

Fig. 7 is a partial sectional view showing another modified form of the present invention;

Fig. 8 is an elevational view showing a modified stud member;

Fig. 9 is a fragmentary elevational view showing another modified shank portion of a stud member;

Fig. 10 is a fragmentary elevational view showing still another modified shank portion of a stud member;

Fig. 11 is a partial sectional view showing a further modification of this invention; and Fig. 12 is a sectional view showing another modified anchor member.

Referring now more specifically to the drawings wherein like parts are designated by the same numerals throughout the various figures, a preassembled fastener unit 10 embodying one form of the present invention is shown in Figs. 1 through 4. Various uses for the fastener unit 10 will suggest themselves, and in Figs. 1 and 4 the fastener unit is shown applied to an apertured work structure including panels 12 and 14 for retaining the panels in assembled relationship. The fastener unit 10 includes a stud member 16 and an anchor member 18 which are interconnected in preassembled relationship as shown in Fig. 2 and then inserted into apertures 20 and 22 in the work structure panels as shown best in Fig. 4.

The stud member 16 may be formed from any suitable material and it is preferably formed from a relatively rigid material such as metal. The stud member is provided with a head portion 24 for overlying and engaging one side of the work structure and an axially extending shank portion 26 adapted to be inserted through the work structure apertures. In this embodiment the peripheral surface of the shank portion 26 is smooth and substantially uninterrupted so as to promote economical manufacturing of the stud member, and the entering end portion 28 of the shank is tapered in the manner shown to facilitate assembly of the anchor member.

The anchor member 18 is formed from a relatively resilient material and is preferably formed from a plastic material such as nylon or polyethylene. The anchor member includes an elongated shank portion 30 having an axially extending opening or bore 32 therein for receiving the shank portion of the stud member. The bore 32 in the anchor member is formed so that it initially has a diameter less than the diameter of the stud shank portion 26. As a result, a force fit is obtained between the stud shank portion 26 and the anchor member shank portion, and the anchor member shank portion is expanded upon assembly thereof with the stud member shank portion. Thus, the inherent resiliency of the anchor member material causes the anchor member shank portion 30 aggressively to grip the stud member shank portion to resist axial separation of the stud member and anchor member. Preferably, the anchor member is provided with a closed entering end 34 which serves to locate the anchor member on the stud shank portion 26 by engaging the entering end of the stud shank portion whereby the stud and anchor members may be easily assembled in a proper manner and the anchor member is prevented from sliding axially up on the stud member shank during application of the fastener unit to the work structure.

The anchor member 18 is provided with an enlarged resiliently collapsible portion adjacent to and axially spaced from the stud member head for engaging an inner surface of the work structure or a surface facing oppositely from the stud member head and retaining the fastener unit against unauthorized disassembly from the work structure. More specifically, the anchor member is provided with a frusto-conical portion 36 flaring from its shank portion outwardly and toward the head of the stud member and another portion 38 having a peripheral surface 40 converging from the frusto-conical section 36 toward the head of the stud member. An internal opening or bore 42 is provided within the anchor section 38 having a diameter substantially greater than the diameter of the stud member shank portion, and the bore 42 is connected with the bore 32 by a tapering bore 44 through the anchor portion 36, which tapering bore also is larger than the stud shank portion whereby to facilitate collapsing of the anchor portions 36 and 38 as the fastener unit is inserted through the work structure apertures. The anchor portion 38 terminates adjacent to but spaced from the head portion 24 of the stud member so as to provide clearance for the apertured panels of the work structure.

The preassembled fastener unit 10 may be rapidly and easily applied to the apertured work structure merely by inserting the shank portions of the stud member and the anchor member through the workpiece apertures. As this is done, the peripheral surface 46 of the anchor portion 36 provides cam means engageable with the edges of the workpiece apertures for promoting collapsing of the anchor portions 36 and 38 to permit these portions to pass through the apertures. When the fastener member is fully applied to the work structure, the inherent resiliency of the fastener unit material resiliently biases the anchor portion 38 outwardly and the peripheral surface 40 thereof provides shoulder means which is urged into engagement with the inner edge or surface of the work structure for preventing unauthorized removal of the fastener unit. It should be noted the peripherally uninterrupted surface 40 of the anchor member will engage the workpiece continuously about the aperture 22 so as effectively to seal the aperture against the passage of moisture, dust and the like. It should also be noted that the relatively thin and flexible terminal edge 48 of the anchor portion 38 is collapsed and aggressively engages the stud member shank when the fastener unit is applied to the work structure as shown in Fig. 4 so as to further restrain the stud member against axial separation from the anchor member.

In Figs. 5 and 6 there is shown a modified form of the present invention which is similar to the above described structure as indicated by the application of identical reference numerals with the suffix "a" added to corresponding elements. In this embodiment, the anchor member 18a is provided with a head or flange 50 abutting the head portion 24a of the stud member and adapted to engage the outer surface of the work structure and space the stud member head portion therefrom. The flange 50 is integrally joined with the anchor portion 38a by means of a thin-walled tubular section 52. As shown in Fig. 6, the thin-walled section 52 is sufficiently flexible to collapse with the anchor portion 38a. This embodiment is especially useful in installations such as electrical equipment panels wherein it is desired to insulate the stud member from the remainder of the work structure.

Fig. 7 shows another embodiment of the present invention which is similar to the structures described above as indicated by the application of identical reference numerals with the suffix "b" added to corresponding elements. In this embodiment, the anchor member 18b differs from the above described anchor member 18a in that the flange or head portion 50b is relatively thin and flexible. With this structure the flange 50b may be easily deformed into any irregularities in the surface of the work structure when it is clamped against the work structure by the stud head portion so as to provide an additional seal around the work structure aperture.

Fig. 8 shows a modified stud member 16c which may be used in combination with any of the anchor members described above. In this embodiment the shank portion 26c of the stud member is provided with a plurality of axially spaced annular protuberances or barbs 54 which are adapted to embed themselves in the anchor member so as positively to interlock the stud member and anchor member against axial separation.

Fig. 9 shows the shank portion of another modified stud member 16d which also may be used in combination with any of the anchor members described above. In this embodiment an enlarged head 56 is provided at the entering end of the stud shank portion 26d which head extends radially from the shank portion as at 58 to provide an annular shoulder or protuberance adapted to be embedded in the anchor member positively to restrain axial separation of the anchor member and stud member from each other.

Fig. 10 shows the shank portion of still another modified stud member having protuberance means for providing a positive interlock between the stud member and an anchor member. In this embodiment the shank portion is knurled as at 60 or is otherwise roughened so as to interengage the bore wall of the anchor member. It is understood that this stud member may also be used with any of the above described anchor members.

Fig. 11 shows a further modified form of the present invention which is similar to the above described structures as indicated by the application of identical reference numerals with the suffix "f" added to corresponding elements. In this embodiment the shank 26f is relatively short as compared with the devices described above so that it projects only slightly behind the workpieces. In order to permit the use of such a relatively short stud member, the workpiece engaging portion of the plastic anchor member is located at the entering end of the anchor member in the manner shown rather than at the end of the anchor member adjacent the head of the stud member. It will be appreciated that the device 10f may be applied to the workpieces and functions in substantially the same manner as the devices described above, and it is also understood that the stud member may be provided with projections or serrations such as those shown in Figs. 8, 9 and 10.

Fig. 12 shows an anchor member 18g which is identical to the above described anchor member 18 except that the entering end of the anchor member 18g is open. This structure facilitates manufacturing of the anchor member and requires less stock material.

From the above description, it is seen that the present invention has provided a novel preassembled fastener unit including a stud member and an anchor member which is of simple and economical construction and which may be easily applied to an apertured work structure from one side thereof. It is also seen that a preassembled fastener unit constructed in accordance with the present invention not only provides great resistance to axial separation of the stud member from the anchor member and unauthorized disassembly of the fastener unit from the work structure, but also is capable of effectively sealing the work structure aperture against the passage of dirt, moisture or any foreign material therethrough.

While the preferred embodiments of the present invention have been shown and described herein, it is obvious that many structural details may be changed without departing from the spirit and scope of the appended claims.

The invention is claimed as follows:

1. A preassembled fastener unit for application to an apertured work structure from one side thereof, comprising a stud member having a head portion including a generally radially extending clamping face for overlying one side of a work structure for preventing the unit from passing through the work structure aperture and an elongated axially extending shank portion insertable through a work structure aperture, and a one piece molded plastic elongated anchor member fixed on said shank portion and insertable through a work structure aperture, said anchor member having axially extending bore means receiving said shank portion, said anchor member including a collapsible resilient circumferentially substantially continuous enlarged portion axially spaced from said head portion surrounding said shank portion and including an internal annular surface having a diameter greater than the diameter of said shank portion and disposed to provide an annular void within said enlarged portion and into which the enlarged portion may be collapsed during application of the fastener unit to a work structure, an entering end section of said enlarged portion flaring outwardly toward said head portion for facilitating collapsing of the enlarged portion during insertion thereof into a work structure aperture, a trailing end section of said enlarged portion converging toward said head portion and disposed in alignment with said clamping face for providing shoulder means engageable with an inner surface of a work structure for cooperating with said head portion for retaining the fastener unit in assembled relationship with the work structure, said anchor member including a thin flexible walled neck portion extending from said trailing end section of said enlarged portion toward said head portion and having an internal diameter greater than said shank portion, and a substantially radially extending flange integral with said neck portion and disposed adjacent said stud member head portion for spacing the stud member head portion from the work structure.

2. A preassembled fastener unit, as defined in claim 1, wherein said flange is relatively thin and flexible and is adapted to be pressed into sealing engagement with the work structure.

3. A fastener of the snap-in type including an elongated hollow sleeve member of deformable plastic material having an elongated internal bore for accommodating and peripherally gripping an axially insertable complementary stud member having a work clamping surface at one extremity thereof, the external diameter of said sleeve member being complemental with the work aperture into which it is adapted for insertion, work engageable means formed integral with said hollow sleeve member at the trailing extremity thereof and comprising a circumferentially continuous enlargement extending axially for a limited extent to provide a radially contractible and expandable tubular bulbous section, the thickness of the plastic material forming the bulbous section not substantially exceeding the thickness of the material forming the sleeve member with the normal maximum outer diameter of said bulbous section being greater than the external diameter of said sleeve member and with the minimum inner diameter of said bulbous section being normally greater than the diameter of the bore so as to present a circumferential space defined by the inner peripheral surface of said section and the adjacent periphery of an inserted stud member whereby to enable collapsing of said bulbous section against said stud upon forcible insertion of the sleeve member within a work aperture and free expansion of the bulbous section away from said stud after such insertion has been completed, the entering extremity of said bulbous section tapering radially outwardly from the periphery of the elongated sleeve member to facilitate initial insertion of the fastener in a work aperture, and the trailing extremity of said bulbous section tapering radially inwardly and presenting a shoulder for lockingly and sealingly engaging a complementary surface defining a work aperture after complete insertion of the fastener within said aperture, and abutment means formed integral with said sleeve member for limiting the extent to which a stud may be axially inserted within said elongated bore.

References Cited in the file of this patent

UNITED STATES PATENTS

| | | |
|---|---|---|
| 204,913 | Pratt | June 18, 1878 |
| 1,483,218 | Fahnestock | Feb. 12, 1924 |
| 1,743,492 | Sipe | Jan. 14, 1930 |
| 1,743,493 | Sipe | Jan. 14, 1930 |
| 2,396,035 | Billing et al. | Mar. 5, 1946 |
| 2,773,554 | Lindorf | Dec. 11, 1956 |